June 30, 1970   M. K. TAYLOR   3,518,664
MAGNETICALLY ACTUABLE VISUAL DISPLAY SURFACE WITH MAGNETIC BIAS
Filed July 18, 1966   2 Sheets-Sheet 1

INVENTOR.
MAURICE K. TAYLOR
BY
*Westell & Hanley*

June 30, 1970 M. K. TAYLOR 3,518,664
MAGNETICALLY ACTUABLE VISUAL DISPLAY SURFACE WITH MAGNETIC BIAS
Filed July 18, 1966 2 Sheets-Sheet 2

INVENTOR.
MAURICE K. TAYLOR
BY
*Westell & Hanley*

United States Patent Office 3,518,664
Patented June 30, 1970

---

3,518,664
MAGNETICALLY ACTUABLE VISUAL DISPLAY SURFACE WITH MAGNETIC BIAS
Maurice K. Taylor, Weston, Ontario, Canada, assignor, by mesne assignments, to Ferranti-Packard Limited, Toronto, Ontario, Canada
Filed July 18, 1966, Ser. No. 566,115
Int. Cl. G08b 5/24, 5/30
U.S. Cl. 340—373        6 Claims

ABSTRACT OF THE DISCLOSURE

Magnetically actuable pivotally mounted visual elements having two alternative positions are controlled in accord with the directions of two resultant exterior magnetic fields alternatively applicable. Each resultant field results from the resolution of one sense of a reversible magnetic field and of a non-reversing bias field.

---

This invention relates to the operation of one or more magnetically actuable elements of the type shown in my U.S. Pat. No. 3,140,553 and in my U.S. application 534,273 filed Feb. 14, 1966 now Pat. No. 3,303,494, a continuation-in-part of application 342,057 filed Feb. 3, 1964 now abandoned and in other U.S. applications filing particulars of which have not been received.

In these cases, an array of rotatably mounted elements is provided, each element carrying a magnet which defines a magnetic axis at an angle to and preferably perpendicular to the rotation axis, and two contrastingly colored surfaces on said element, alternatively displayed by alternative orientations of said element. Corresponding to each element, are means exterior thereto, for selectively providing one or another magnetic field designed to selectively rotate said element to display, respectively, one or the other of said contrasting surfaces; whereby, through the combined appearance of the elements in the array, a design, indicia is displayed.

By "rotatably" or "pivotally" mounted in relation to a magnetically actuable element we include the situation as disclosed in application Ser. No. 555,053 filed June 3, 1966, where the element is placed in a liquid in which it has substantially neutral buoyancy and may rotate therein although no pivotal or rotation shaft joins the element to a mounting.

As an alternative to the use of a plurality of magnetically actuable elements in an array it is possible that these may be used individually as binary indicators.

In the prior design, as disclosed in my U.S. Pat. No. 3,140,553, the exterior field was selectively reversible and caused a rotation of the magnetically actuable element of substantially 180°. In certain applications of this development or allied thereto, special consideration had to be given to the fact that since the magnetically actuable element field tend to align with the reversible field then on the subsequent reverse of the reversible field a very limited starting torque was available since the fields were substantially parallel and the torque is approximately proportional to the sine of the angle between. them which sine (and angle) were substantially zero.

Various methods have been suggested for overcoming this difficulty including the provisions of stops which limited the rotation of the element to somewhat less than 180° to ensure some starting torque and also means such as those disclosed in my copending application No. 554,472 filed June 1, 1966 wherein the contrasting faces are separated by 120° or less with the magnetically actuable field intermediate the perpendiculars to the two faces so that the element field and the reversible field are never closer than 30° to alignment.

This application suggests a new method of ensuring, that on selective reversal of the exterior field, a good starting torque will be applied to the magnetically actuable element.

It is an object of this invention to provide a device wherein magnetically actuable elements are caused to move between two positions separated by less than 180° under the influence of one of two alternatively selectable resultant fields, such resultant fields being produced by the combined effect of a reversible field and a bias field at an angle of other than 180° thereto.

Mechanical stops for limiting the movement of the pivotally mounted element may be provided if desired, but it will be seen that whether these are provided or not, the magnetically actuable element will tend to align with the resultant field and that its range of rotation will always be less than 180° and through the angle of alignment of the pivotal element magnetic field with the bias field (the mechanical stops being so arranged if used) and that its starting torque will always be of substance since although the reversible field is intermittently reversed 180°, the resultant field is rotated through an angle of less than 180°.

In this way means are provided for procuring sure operation of the magnetically actuable elements and a fast response time.

In drawings which illustrate a preferred embodiment of the invention.

Figure 2:
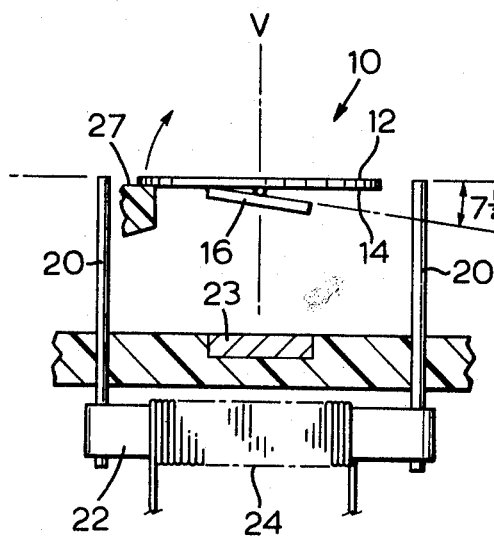
FIGS. 2 and 3 show one element in the module and the mounting therefor.
Figure 5:
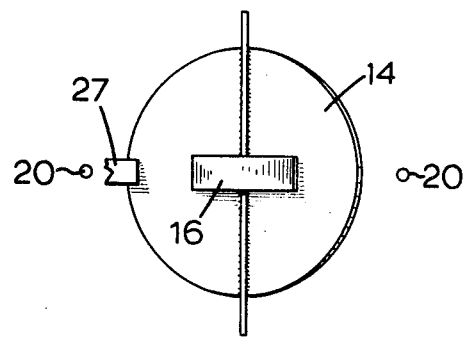

With reference to FIGS. 2 and 5, it will be seen that for each module, there is provided a magnetically actuable element 10 having two contrasting surfaces 12 and 14 thereon which may correspond in angular direction, to the relative orientations of the resultant field to be provided.

In other words if the resultant fields are separated by an angle of 165° then the angular separation of the contrasting surfaces relative to the pivotal axis of the element 10 might be designed to be 165°.

However for practical purposes and to facilitate construction, it has been found that with an angular range of 165° between resultant fields, the contrasting surfaces may be displaced 180° from one another (i.e. on opposite sides) and still produce good visual effects.

Mounted on the pivotally mounted elements to rotate therewith will be a magnet 16 with its field oriented to define a magnetic axis, intermediate the radii from the pivotal axis through the contrasting surfaces 12 and 14 and preferably with the magnetic axis half way between said radii. It will thus be realized, that the orientation of magnet 16 will be so arranged relative to the directions of the resultant field that with one resultant field and the magnet on the rotatably mounted element aligned therewith, then one of the contrasting surfaces will be displayed and with the magnet aligned with the other resultant field, the other contrasting will be displayed.

Mechanical stops may be provided, if desired to limit "hunting" movement of the pivotally mounted elements but in any event these will allow rotation of the element over an angular range which includes the position where the field from magnet 16 and the bias field align.

Figure 6:
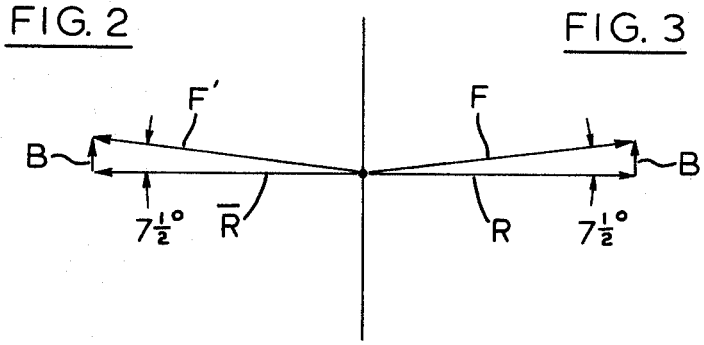
FIG. 6 is a schematic representation of the magnetic fields involved.
Figure 4:
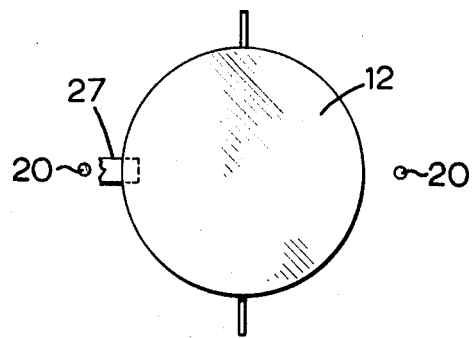
FIGS. 4 and 5 show front view of the element in FIGS. 2 and 3.

It may be helpful in relation to the means for supplying the reversible and bias fields, to refer to FIG. 6 where is shown a vector analysis of these fields at the location of a magnetically actuable element. In FIG. 6, the reversible field is represented by the opposed vectors R and R'. The effect of the bias field is shown as a vector B on the right added vectorially to the vector R and, on the left, added vectorially to the vector R̄. It will be seen that the result are resultant fields F and F' alternatively, selectable by reversal of the field R to R̄, or vice versa, while maintaining the bias constant. It is noted that, to obtain a field where the resultant fields F and F' are at 165° to one another (the preferred amount) the relative strengths of the reversible field and the bias fields should be chosen so that the angle between a reversible field and the corresponding resultant field is 7½°.

The means for pivotally mounting the element 10 is not shown in detail, as this is well known and also is shown in the application already referred to.

Means are provided, corresponding to each of the magnetically actuable elements to provide a selectively reversible magnetic field suitably disposed to supply rotation torque to the rotatable element, if the angle between the exterior field and the rotatable field is sufficient to cause rotation. Means for providing this are disclosed in all of the patent applications referred to but for the purpose of this application, it will be sufficient to say that a pair of pole pieces 20 are provided on each side of the rotatable element 10 and on each side of the pivotal axis thereof, and these are connected by a magnetic flux permeable member 22 to which is applied an energizing winding 24 and where, by various means of selective energization, the elements, if rotated, can be caused to assume selective orientations to produce the display desired.

In addition however, to the selectively reversible field, which with its means of production, is well known to those skilled in the art; there is provided, a bias field suitably located to affect the magnetic field environment at a magnetically actuable element and to make an angle (other than an integral multiple of 180°) with the direction of the selectively reversible field in either direction of the latter. Preferably, the bias field will be perpendicular to the reversible field and to the pivotal axis.

Figure 3:
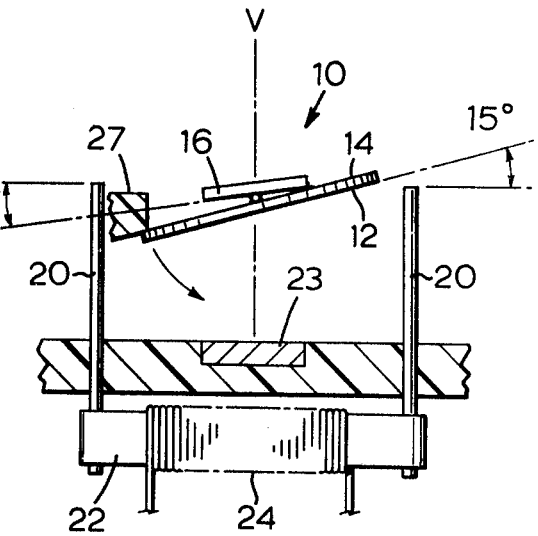

In the embodiment shown in FIGS. 2 and 3 there would be provided a small permanent magnet 23 located between the pole pieces 20 which is magnetically polarized to provide the bias field B perpendicular to both the field between pole pieces 20 and to the pivotal axis of the element. The permanent magnet might have been replaced by an electromagnet.

Figure 1:
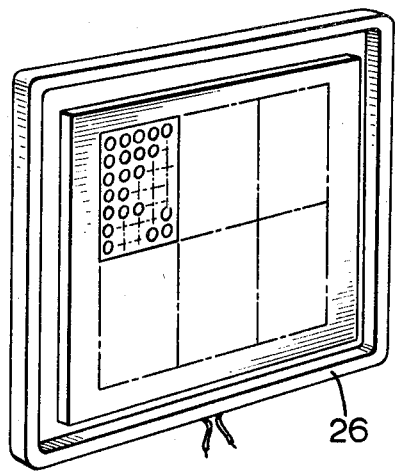
FIG. 1 shows an array comprising 6 character forming modules each module comprising (say) thirty-five elements.

However, since the bias field may remain unchanged with intermittent reversals of field R, it is not necessary that individual bias field forming members be provided. As an alternative, there may, as indicated in FIG. 1 be provided a single bias field by a winding 26 extending about the whole array and thus producing a field in the viewing direction relative to the array, perpendicular to the axis of the individual elements, and to the reversible field from the individual pole pieces. Such bias field would, for the plurality, of magnetically actuable elements which it encompassed, form with the individual reversible field for each element, form a resultant field at each element.

It will be noted, from reference to FIG. 6, that the relation between the strength of the bias field B and the selectively reversible field F and F̄ will determine the direction of the resultant field. And it will be noted that the smaller the angle between the resultant fields the greater the starting torque but conversely, the smaller the contrasting surface which may be used, whose largest area is available when they are 180° opposed.

In FIG. 6 is shown the vector directions wherein the biasing field B is very small relative to the selectively reversible field so that the angle between the resultant fields thereby produced is just less than 180° (preferably about 165°). In accord with such development, the magnetically actuable element comprises a disc having the opposite faces opposingly colored, since the difference in the angle between the perpendicular to the disc face and the viewing direction will be small enough to be non-apparent in the average display.

Preferably this is arranged as shown in FIGS. 2 and 3, where the resultant fields are each 7½° from the line joining the ends of pole pieces 20 as shown in FIG. 6.

The surface 12 should be considered as the surface, more highly contrasting with the mounting (usually white) and the surface 14 should be considered as the surface contrasting less highly with the mounting (usually black). The magnet 16 is oriented at 7½° to the surface 12 and therebehind when the surface 12 is displayed in the viewing direction V, with the 7½° deflection of the magnet 16 leading in the intended rotation direction of the element.

Thus the element shown, or each element in an array, will assume with the reversible field R̄, or a position where the magnet 16 is aligned with the field F' (see FIG. 6), and surface 12 is displayed. When the reversible field is switched to R, the element will rotate 165° (clockwise in the figures) to a position where the magnet is aligned with the field F and the surface 14 is displayed although at 15° to the viewing direction.

Again switching the field to R̄ rotates the element counterclockwise to the position of FIG. 2.

It has therefore been found that with contrasting surfaces 180° opposed, best visual results are achieved when the higher contrasting surface is displayed when perpendicular to the viewing direction and the lower contrasting surface is displayed at the angle to the viewing direction equal to the difference between the rotation angle and 180°.

However, it should be realized that the invention is not limited to devices where the surfaces are 180° opposed although this will be a common design.

In FIGS. 2 and 3 there is shown a single stop 27 which is not necessary, but may be used to stop oscillation or hunting of the element on reaching a desired position. The stop 27 is here proportioned to limit rotation of element 10 in either direction at the point of alignment of magnet 16 with the resultant field. It will be realized that two separate stops could be used if desired. It will be realized that it is within the scope of the invention to have the stop limit rotation outside or slightly inside the angular displacement range between the resultant field directions, it being understood that the stop will always permit rotation at least a portion of that angle between the resultant fields which includes the direction where the bias field and the magnetic element fields are aligned.

It will be noted that the angle between the resultant fields must be less than 180° to achieve the purposes of the invention. It is noted that the larger such angle is (less than 180°) the better will be the display properties, and the poorer the starting torque while a lesser angle will improve the starting torque at some cost to the display properties.

I claim:
1. For a display or indicating device comprising:
   a pivotally mounted element;
   said element being designed to be magnetically actuable by a field exterior thereto to control the orientation of such element on its pivotal axis;
   mounting means for said element defining an intended viewing direction;
   means corresponding to said elements but exterior thereto for providing a selectively reversible magnetic field suitably disposed to apply rotational torque to the element to which it corresponds;
   means for providing at said elements, a permanently applied bias field external to said element suitably disposed to magnetically affect said element and at an angle other than an integral multiple of 180° to both senses of said selectively reversible field;
   whereby selectively, alternative, resultant fields at said pivotally mounted element are formed by said bias field and one of said respective senses of said selectively reversible field;

whereby said pivotally mounted element will move toward respective selective alignment with said resultant fields and rotate through the smaller angle on the reversal of said selective reversible field;

and a pair of exterior surfaces of contrasting appearance on each of said elements, arranged so that one of said surfaces is displayed in a viewing direction, in one orientation of said element as governed by one resulting field and the other is displayed in such viewing direction in the other orientation of said element as governed by the other resulting field.

2. A device as claimed in claim 1, wherein the bias field is approximately perpendicular to said reversible field direction.

3. A device as claimed in claim 1, wherein means are provided for limiting the rotation of said elements in either pivotal direction and wherein said rotation limiting means allows rotation of the pivotally mounted element through the major portion of the angle between said resultant field directions which includes alignment between said bias field and said magnetically actuable element field.

4. An array of elements and exterior fields as claimed in claim 1 so arranged that the contrasting surfaces of said elements may be collectively viewed in said intended direction, wherein an individual selectively reversible field is provided for each of said elements and wherein a single bias field is provided for a plurality of said elements.

5. An array of elements and exterior fields as claimed in claim 2 so arranged that the contrasting surfaces of said elements may be collectively viewed in said intended direction, wherein an individual selectively reversible field is provided for each of said elements and wherein a single bias field is provided for a plurality of said elements.

6. An array of elements and exterior fields as claimed in claim 3 so arranged that the contrasting surfaces of said elements may be collectively viewed in said intended direction, wherein an individual selectively reversible field is provided for each of said elements and wherein a single bias field is provided for a plurality of said elements.

References Cited
UNITED STATES PATENTS

| | | | |
|---|---|---|---|
| 3,074,060 | 1/1963 | Kadlec | 340—373 |
| 3,140,553 | 7/1964 | Taylor. | |
| 3,364,481 | 1/1968 | Fuzzell | 340—373 |
| 3,025,512 | 3/1962 | Bloechl | 340—373 |
| 3,140,431 | 7/1964 | Schalkwijk | 340—373 X |
| 3,240,965 | 3/1966 | Casey | 340—378 X |
| 3,392,382 | 8/1968 | Pursiano. | |
| 3,113,301 | 12/1963 | Templin. | |

HAROLD I. PITTS, Primary Examiner

U.S. Cl. X.R.

340—336, 366, 378